March 22, 1966 G. SANTUZ 3,242,387
MAGNETIC AMPLIFIER DEVICE FOR CONTROLLING THE OPERATION
OF TEMPERATURE REGULATING APPARATUSES
Filed Feb. 21, 1963
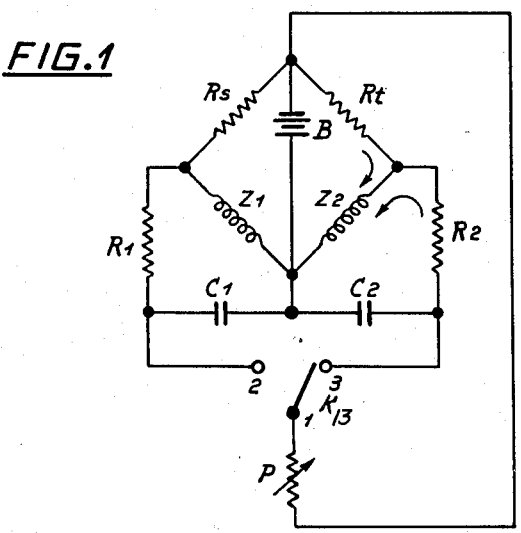
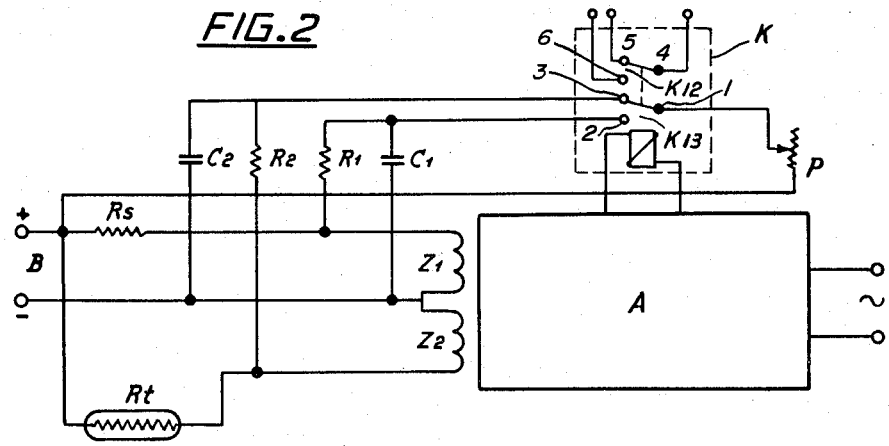
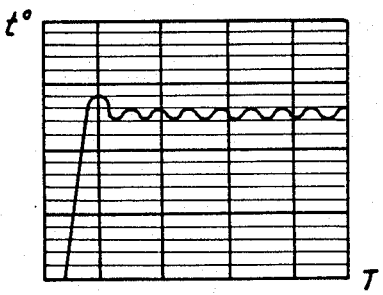
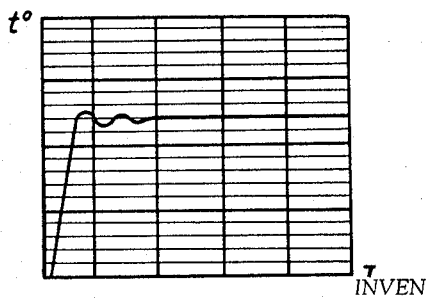
INVENTOR.
GINO SANTUZ
BY Stowell & Stowell
ATTORNEYS 3,242,387
MAGNETIC AMPLIFIER DEVICE FOR CONTROLLING THE OPERATION OF TEMPERATURE REGULATING APPARATUSES
Gino Santuz, Milan, Italy, assignor to Filoteonica Salmoiraghi S.p.A., Milan, Italy, a corporation of Italy
Filed Feb. 21, 1963, Ser. No. 260,167
Claims priority, application Italy, Mar. 13, 1962, 5,078/62
3 Claims. (Cl. 317—132)

The present invention relates to a device apt to control the operation of temperature regulating apparatuses used to maintain the temperature constant.

The control and the regulation of temperature, in the industrial field, as, by way of example, for the compression molding of plastics or for heat treatment furnaces, must be effected so that the working temperature is kept constant between very narrow limits, which condition requires the use of apparatuses having great sensitivity, so as to operate with a quick response.

In these apparatuses, however, it is not taken into consideration the thermal inertia of the metallic body or of the insulating lining of the furnaces or the like, so that, when the thermo-sensitive element detects a temperature decrease, the temperature of the furnace or the like has already dropped beyond the predetermined limit. And in the same manner when the thermo-sensitive element detects a temperature increase, the temperature of the furnace is greater than the predetermined one, and such temperature tends to increase owing to the thermic inertia, also when the heating is interrupted.

It follows that the thermal working rate of the furnace or the like is not continuous, and presents maximum and minimum values of certain amplitude, whose path is usually sinusoidal or undulated.

Such a thermal working rate is not suitable for certain technological operations where it is necessary to have, as said before, an absolutely constant temperature.

An object of this invention is to prevent the afore-considered disadvantages; the invention being applicable in a bridge circuit, wherein two arms are constituted by the control windings of a magnetic amplifier, and the other two arms are constituted by a thermo-resisting detector, i.e. a detector whose resistance varies with temperature, and a reference resistance; which invention is characterized by differentiated action means in combination with the two arms of the bridge constituted by the control windings of the magnetic amplifier, so as to vary the current flowing in such windings and to vary accordingly the connection or disconnection of the heating source, in accordance with the increased or decreased detected temperature.

According to the invention, condensers are provided in parallel with the two arms of the bridge which are constituted by the control windings of the magnetic amplifier. These condensers are selectively interposed in a feeding circuit by means of a relay actuated, through the magnetic amplifier, by the variations of temperature, so that, when the detected temperature tends to decrease the relay is de-energized and closes a circuit which charges one of the condensers, whose potential at the terminals causes a current to flow, which adds to and reinforces the current flowing in the magnetic amplifier winding, in parallel with the one condenser itself, in order to cause a time-advanced excitation of the relay; while, when such relay is energized, a circuit establishes which charges the other condenser, whose potential at the terminals causes a current to flow which adds to and reinforces the current flowing in the other winding of the magnetic amplifier, in order to a timer-advanced de-energization of said relay for interrupting the heating supply, so that the temperature of the furnace or the like remains substantially constant. It is evident that the features of the elements of the circuit, and particularly of the condensers connected in parallel with the magnetic amplifier windings, can vary according to the desired use of the device, and particularly in conformity with the mass and with the thermal inertia of the utilizer load (furnace or the like).

FIGURE 1 is a wiring diagram of the device according to the invention;

FIGURE 2 is a practical diagram of such device, and,

FIGURES 3 and 4 are diagrams, illustrating the course of the thermal rate of a heating furnace provided respectively with a conventional thermo-regulating device and with a thermo-regulating device according to the invention.

With reference to these figures, the illustrated device comprises a magnetic amplifier A, two control-windings of which $Z_1$ and $Z_2$ form two of the arms of the Wheatstone bridge. The other two arms of such bridge are constituted by a reference resistance $R_s$ and by a thermometric resistance $R_t$, which forms the thermo-sensitive element.

The device according to the present invention comprises a variable resistance P, and resistance $R_1$ and $R_2$, connected between one of the terminals of condensers $C_1$ and $C_2$ and the starting point of the windings $Z_1$ and $Z_2$, respectively. Each one of these resistance-capacity groups is connected in parallel with the corresponding control winding $Z_1$ and $Z_2$ of the magnetic amplifier A. Battery B, which supplies power to the afore-considered bridge, supplies also power, through the variable resistance P and the contacts of the relay K, to the condensers $C_1$ and $C_2$. Relay K is actuated by the unbalanced electrical condition of the bridge through the magnetic amplifier A, and comprises pairs of switching contacts $K_{13}$ and $K_{12}$. Contacts 5 and 6 of $K_{12}$ control the heating supply of the load, a furnace or the like, not shown. Contacts 3 and 2 of $K_{13}$ connect with the condensers $C_2$ and $C_1$, while the fixed contact terminal 1 of the movable switch arm connects with battery B through the variable resistance P.

When the current in $Z_1$ exceeds that in $Z_2$ the relay is de-energized, as shown in FIGS. 1 and 2; when the bridge is balanced, the relay K is energized and equal currents flow in the windings $Z_1$ and $Z_2$; when the current in $Z_2$ exceeds that in $Z_1$ the relay is energized.

Assuming that the temperature detected by the thermometric detector $R_t$ is greater than that wanted or necessary, the bridge unbalances and in the winding $Z_1$ flows a current greater than that flowing in winding $Z_2$. As a consequence of the unbalanced condition of the bridge, relay K is de-energized and condenser $C_2$ is charged over a path which includes contacts 1 and 3 of $K_{13}$ and the potential thereof provides a current flow which adds to and reinforces the current flowing in winding $Z_2$ and which tends to rebalance the bridge in order to energize relay K, whose entering into operation is thus advanced in time with respect to the usual intervention of relay K in the absence of condenser $C_2$.

By energizing relay K, contacts 4 and 5 of $K_{12}$ are opened and contacts 4 and 6 of $K_{12}$ and 1 and 2 of $K_{13}$ are closed. The closing of these $K_{13}$ contacts causes the progressive charge of condenser $C_1$ and the current originated by the potential across the terminals of $C_2$ adds to the current flowing in the winding $Z_2$. When the resulting current flowing in winding $Z_1$ is greater than the current flowing in winding $Z_2$, the bridge unbalances in the opposite direction, causing the time-advanced opening of relay K, which thus interrupts the heating circuit contacts of $K_{12}$ and consequently the heating supply of the considered utilizer (furnace or the like).

Therefore the rate of heating supply of such furnace or the like presents a rectilinear path, as shown in the diagram of FIGURE 4, which is in contrast to the undulated path of FIGURE 3. Consequently, with this device heating is supplied to the furnace or the like in a more efficient manner, and the average value of the power absorbed by the furnace or the like results proportionally, within certain limits, to the variation of temperature of the considered heating rate.

In the described and illustrated device various rearrangements and modifications can be made; by way of example, according to the features of the magnetic amplifier A, the relay K could be in practice constituted by a conventional remote control switch, to feed directly a thermo-electric resistance, which constitutes the heating source. Or, in the same way, relay K could control the operation of a solenoid valve, of motor driven valve or like elements, controlling the feeding of fuel. It is evident that the anticipated intervening action of the device can be regulated, through the variable resistance P, also through other means, as, by way of example, by varying the capacity of condensers $C_1$ and $C_2$.

In practice various rearrangements and modifications may be made in the invention without departing from the spirit and scope thereof.

What is claimed:

1. Control circuit means for use in combination with magnetic amplifier thermo-regulating control apparatus, such apparatus including a magnetic amplifier; a self-balancing bridge circuit wherein two adjacent arms are constituted by two control windings of the magnetic amplifier, and the other two arms consist of a thermo-sensitive impedance and a reference resistance, respectively; a two-terminal source of D.C. potential connected across said bridge from the interconnection point of said two adjacent control winding arms to the interconnection point of said other two arms; and a relay energized by the amplifier having at least one double-throw switch arm which controls the regulation of the temperature of a load; comprising, in combination;

a further double-throw switch arm on said relay having a fixed contact terminal on the arm, and two switching contacts selectively engageable by such arm;

a series-circuit including a variable resistance sensitivity regulation control element connected between said fixed contact terminal and one terminal of said D.C. potential source;

resistance-capacity means associated with each said control winding comprising a series-connected condenser and resistor pair, the free terminal of each condenser being connected to said interconnection point of the control winding bridge arms, the free terminal of each resistor being connected to the opposite end of the respective control winding with which it is associated, and a connection from the series-connected terminal of a condenser and resistor pair to a respective one of said two switching contacts.

2. Control circuit means as in claim 2 wherein said resistance-capacity means produces a differentiated control action.

3. Control circiut means as in claim 2 wherein said series-circuit from said D.C. potential source through said further double-throw relay switch arm selectively charges one condenser and resistor pair, while the other condenser and resistor pair discharges with a current flow which augments that in the control winding with which it is associated to thereby advance the bridge balance or unbalance action.

References Cited by the Examiner
UNITED STATES PATENTS

| 2,768,347 | 10/1956 | Hansen _____ 317—153 |
| 2,944,137 | 7/1960 | Kaltenbach. |
| 3,052,827 | 9/1962 | Olsen _____ 317—153 |
| 3,105,175 | 9/1963 | Siliani et al. _____ 317—153 X |

SAMUEL BERNSTEIN, *Primary Examiner.*

RICHARD M. WOOD, *Examiner.*

L. H. BENDER, D. YUSKO, *Assistant Examiners.*